US006456379B1

(12) United States Patent
Kunz et al.

(10) Patent No.: US 6,456,379 B1
(45) Date of Patent: Sep. 24, 2002

(54) OPTICAL SMOKE DETECTOR OPERATING IN ACCORDANCE WITH THE EXTINCTION PRINCIPLE AND METHOD FOR COMPENSATING ITS TEMPERATURE DRIFT

(75) Inventors: Peter Kunz, Gossau; Kurt Müller, Männedorf; Dieter Wieser; Markus Loepfe, both of Küsnacht, all of (CH)

(73) Assignee: Siemens Building Technologies AG, Mannedorf (CH)

( * ) Notice: Subject to any disclaimer, the term of this patent is extended or adjusted under 35 U.S.C. 154(b) by 0 days.

(21) Appl. No.: 09/395,720

(22) Filed: Sep. 14, 1999

(30) Foreign Application Priority Data

Sep. 14, 1998 (CH) .......................................... 98117368
Oct. 27, 1998 (CH) .......................................... 2172/98

(51) Int. Cl.[7] ................................................ G01N 21/61
(52) U.S. Cl. ........................ 356/435; 356/438; 340/620
(58) Field of Search ................................ 356/435, 438, 356/439, 433, 434, 437; 340/630, 620; 250/565

(56) References Cited

U.S. PATENT DOCUMENTS

| | | | | | |
|---|---|---|---|---|---|
| 878,458 | A | * | 2/1908 | Darwin | 356/439 |
| 3,552,863 | A | | 1/1971 | Smith | 356/435 |
| 5,517,314 | A | * | 5/1996 | Wallin | 356/437 |
| 5,872,634 | A | | 2/1999 | Kunz | 356/438 |
| 5,926,778 | A | * | 7/1999 | Pöppel | 702/130 |

FOREIGN PATENT DOCUMENTS

| | | |
|---|---|---|
| EP | 0140502 | 5/1985 |
| EP | 0578189 | 1/1994 |
| EP | 0596500 | 5/1994 |
| EP | 0618555 | 10/1994 |
| EP | 0740146 | 10/1996 |

OTHER PUBLICATIONS

AlgoRex®—the new, interactive fire detection system with AlgoLogic®, Cerberus Alarm Nr. 116/1994, pp. 1–8.
"Automatic Fire Detectors", Catalogue S11, Section 2, Aug. 1999, pp. 1–4.
"Cerberus® PolyRex DOT1151, DDOT1152 Neural Smoke Detectors", Manual DS11, Section 2, Aug. 1999, pp. 1–14.

* cited by examiner

*Primary Examiner*—Richard A. Rosenberger
(74) *Attorney, Agent, or Firm*—BakerBotts LLP

(57) ABSTRACT

A detector device for detecting the presence of airborne particles such as smoke includes a light source, an optical bridge, a measurement path, a reference path, a measurement receiver and a reference receiver. The optical bridge, in addition to the light source and the measurement and reference receivers, are the only optical elements of the detector device. The optical bridge includes two circular apertures arranged downstream of the light source along the radiation path. The light source is arranged in a chamber having an air reservoir, whose surface area is substantially greater than that of the light source. A temperature drift curve is determined by heating the light source and storing the detector signal at different temperatures.

29 Claims, 2 Drawing Sheets

OPTICAL SMOKE DETECTOR OPERATING IN ACCORDANCE WITH THE EXTINCTION PRINCIPLE AND METHOD FOR COMPENSATING ITS TEMPERATURE DRIFT

PRIORITY APPLICATION

This application claims priority to European Patent Application No. 98117368.5 filed Sep. 14, 1998, and Swiss Patent Application No. 1998 2172/98 filed Oct. 27, 1998.

FIELD OF THE INVENTION

The present invention relates in general to the detection of airborne particles such as smoke. More particularly, the present invention is related to an optical smoke detector operating in accordance with the "extinction principle" and a method of compensating for the temperature drift of the detector.

BACKGROUND OF THE INVENTION

In a typical extinction measuring method as known in the art, a light beam is transmitted along a measurement section which is accessible to ambient air potentially including smoke, and a corresponding sensor signal is compared with a value which corresponds to the absence of smoke. As both scattering and absorption of light by smoke particles contribute to light attenuation or extinction, and as light is scattered by bright particles and absorbed by dark particles, the extinction measuring method has relatively uniform sensitivity to different types of smoke particles and is equally suitable for the detection of smouldering or low-temperature fires (bright particles) and open fires (dark particles).

When the extinction measuring method is employed in spot detectors, i.e., smoke detectors arranged in a single detector housing, the measurement section is much shorter, and thus a greater sensitivity to smoke particles is required of the transmission measurement. For example, for a 10-cm measurement section, an alarm threshold of 4%/m corresponds to transmission of 99.6% as compared with a reference transmission. If transmission values below the alarm threshold are to be triggered, values of, for example, 99.96% transmission must be detectable, which requires a very high degree of stability of the electronic, optoelectronic and mechanical components of the detector. Transmitted light or spot extinction detectors of this type are described, for example, in European Patent Nos. EP-A-0 578 189 and in EP-A 0 740 146.

A principal source for the instability of conventional spot extinction detectors is the temperature dependence of the associated optical bridge and other optical elements. This temperature dependence results from the fact that the optical elements, including the light source, receivers and associated lenses and mirrors, are typically made of temperature-sensitive materials. Conventional optical devices, such as described in European Patent Nos. EP-A-0 578 189 and EP-A-0 740 146, include waveguides, lenses and/or parabolic mirrors that are made of injection molded plastic material subject to deformation at high temperatures. The parabolic mirrors described in EP-A-0 740 146, for example, are made of plastic material that does not expand isotropically with temperature and thus the stability of the optical device is impacted. The conventional lenses and waveguides described in EP-A-0 578 189 are also influenced by temperature and are therefore also unstable.

SUMMARY OF THE INVENTION

The above-described limitations and inadequacies of conventional spot extinction and transmitted light detectors are substantially overcome by the present invention, in which a primary object is to provide a device for detecting airborne particles, such as smoke or other aerosols, that is more stable and is less sensitive to temperature dependencies of a corresponding optical bridge. This object is realized by the present invention in that the detecting device includes an optical bridge, a light source, a measurement receiver and a reference receiver as the only optical elements of the device, wherein the optical bridge includes two circular apertures arranged in front of the light source. As a result of the omission of the lenses, wave guides and parabolic mirrors of conventional spot extinction detectors, improved detector stability is achieved along with an appreciable reduction in cost.

In a first preferred embodiment of the detector according to the present invention, the light source of the detector is arranged in a chamber having an air reservoir. The surface area of the chamber is preferably substantially larger than the surface area of the light source. This embodiment offers the advantage that, as a result of the large surface area of the chamber, airborne particles such as smoke particles are slowly diffused into the chamber and are deposited on the chamber wall and not only on the light source.

In a second preferred embodiment of the detector according to the present invention, the measurement path includes at least one partition having an aperture that blocks laterally penetrating, interfering light but does not affect the radiation of the light source.

In a third preferred embodiment of the detector according to the present invention, the optical bridge includes two end sections and a center partition connecting the end sections, the measurement path being formed on one side of the center partition and the reference path on the other side, and the chamber with the light source is provided in one end section and the chambers with the measurement receiver and the reference receiver respectively are provided in the other end section. This embodiment offers the advantage that the optical bridge is integrally manufactured and can be practically integrated in any detector housing.

In a fourth preferred embodiment of the detector according to the present invention, the section of the optical bridge containing the reference path is secured to a plate, preferably to the circuit board supporting the evaluating circuit, and is laterally sealed by two side walls connecting the end sections and the center partition.

In another aspect of the present invention, a method is provided of compensating for temperature drift in a detector device, such as a smoke detector, having a temperature sensitive optical bridge. The method according to the invention includes the steps of heating the light source at different temperatures, storing the output of an optical measurement receiver at the different temperatures to characterize the temperature drift of the optical bridge, and adjusting the measurement receiver output to compensate for the temperature drift of the optical bridge.

Preferably, if the detector includes a light source, a light-emitting diode and a micro-heater attached thereto within a light source housing, then the micro-heater is periodically activated in situ in the assembled or installed detector and in this manner the actual temperature drift curve is measured. If the optical bridge is mounted on a support made of a material having good thermal conductivity and such support is provided with a heater, then the heater is activated within the framework of the manufacturing process of the detector or during a detector inspection and the temperature drift curve is thereby measured.

Another possibility of measuring the temperature drift curve in accordance with a preferred method of the present invention includes the steps of placing the detector in an oven at the end of the manufacturing process, connecting the detector to a data bus, heating the oven and thereby measuring the temperature drift curve.

Further objects, features and advantages of the invention will become apparent from the following detailed description taken in conjunction with the accompanying figures showing illustrative embodiments of the invention.

BRIEF DESCRIPTION OF THE DRAWINGS

For a complete understanding of the present invention and the advantages thereof, reference is now made to the following description taken in conjunction with the accompanying drawings in which like reference numbers indicate like features and wherein.

DETAILED DESCRIPTION OF THE PREFERRED EMBODIMENTS

Figure 1:
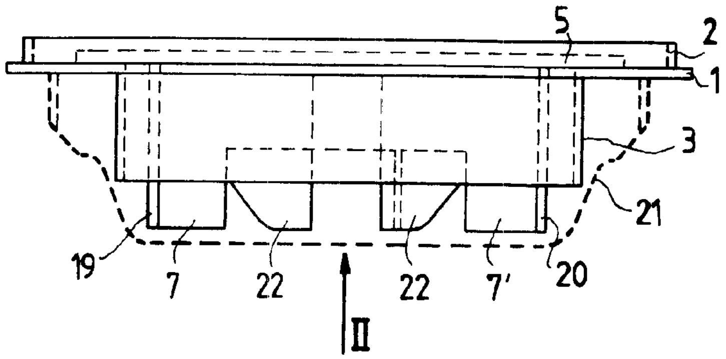
FIG. 1 is a side view of a detector assembly in accordance with a preferred embodiment of the present invention.
Figure 2:
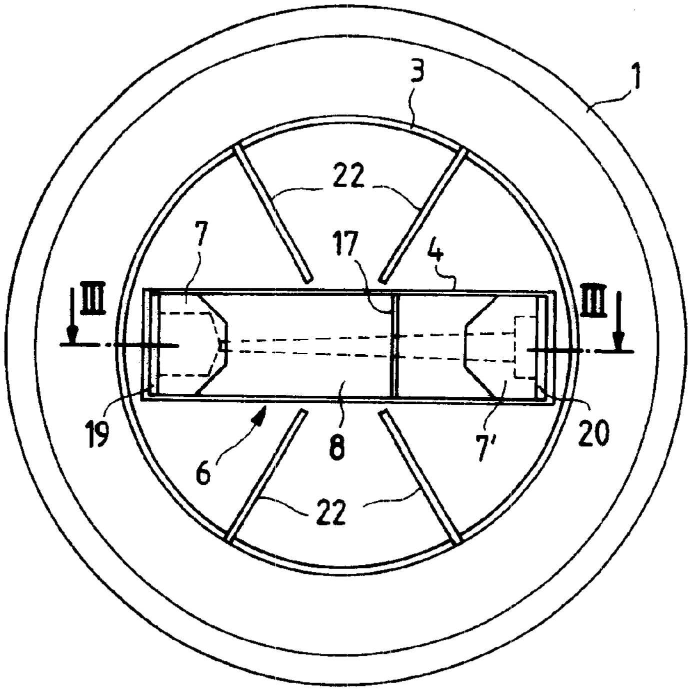
FIG. 2 is a plan view of the detector assembly of FIG. 1 in the direction of the arrow II in FIG. 1.

FIGS. 1 and 2 are side and plan views, respectively, of a detector assembly according to a preferred embodiment of the present invention. The detector of FIGS. 1 and 2 is a spot extinction or transmitted light detector which is used to determine the presence of airborne particles such as smoke or other aerosols. The detector includes a base plate 1 and a detector hood (not shown). Preferably, the base plate 1 is used for mounting the detector on the ceiling of a room or area to be monitored. The detector hood is used to cover the detector assembly, and optionally the base plate 1, and preferably mates and locks into place with the base plate 1.

With further reference to FIG. 1, the base plate 1 is located at the top of the detector assembly with the detector cover attached to the bottom thereof, i.e., the side of the detector assembly facing the room or area to be monitored. Base plate and hood designs for the detector assembly of the present invention are known in the art and therefore will not be described in further detail. Instead, reference is made to the AlgoRex® fire alarm systems available from Siemens Building Technologies AG, Cerberus Division (formerly Cerberus AG), the assignee of the present invention.

The detector assembly of FIGS. 1 and 2 includes the base plate 1, which on the top side includes a peripheral structure 2 and on the bottom side comprises a cylindrical wall 3, as well as a rectangular recess 4 lying within the wall 3, a circuit board 5 having an evaluating circuit, and an optical bridge 6 secured to the circuit board 5. The circuit board 5 is fixed to the top of the base plate 1 within the peripheral structure 2. The optical bridge 6 projects downwards from the underside of the circuit board 1 and is fitted through the recess 4.

The optical bridge 6 is manufactured using a material having good thermal conductivity, preferably aluminum or cast zinc, and includes two end sections 7, 7' and a center partition 8 connecting the two end sections 7, 7'. The end section 7 includes a chamber 9 with a light source 10, and the end section 7' includes two chambers 11 and 12 housing a first optical or "measurement" receiver 13 and a second optical or "reference" receiver 14. A measurement path 15 is formed by the chamber 9, the light source 10, the chamber 11 and the measurement receiver 13. Similarly, reference path 14 is formed by the chamber 9, the light source 10, the chamber 12 and the reference receiver 14.

Arranged in the measurement path 15 is at least one partition 17 having a circular aperture 18 for blocking laterally penetrating, interfering foreign light without affecting the useful light transmitted by the light source 10. Compared with the light source 10, the chamber 9 has a relatively large surface area so that the smoke particles, for example, are slowly diffused into the chamber 9 and deposited on the entire wall of the chamber and not only on the light source 10. Thus, the light source 10 is only very slowly contaminated, if at all, by smoke, dust or other particles. Optionally, a partition 17' having a circular aperture 18' can also be provided in the reference path 16.

The measurement and the reference paths 15, 16 are constructed and arranged in such a manner that the reference path 16 is not accessible to smoke or other particles flowing into the detector from outside. The measurement path 15 by contrast is freely accessible to such particles. A screening of the particles from the reference path 16 is effected by the center partition 8, the two end sections 7, 7' and by two side walls 23 connecting the end sections 7, 7' and the center partition 8. If necessary, the reference path 16 can also be covered at the top towards the circuit board 5 by a plate (not shown) extending over the entire length and width of the optical bridge 6.

The light source 10 includes a light-emitting diode (LED), which for the purposes of this disclosure may include diodes emitting infrared radiation and radiation at other wavelengths, for emitting light or other radiation along the measurement path 15 and the reference path 16. The measurement and reference paths 15, 16 include two circular apertures L, L' arranged along the radiation path downstream of the light source 10 and measuring approximately 1 to 2 mm in diameter. The temperature dependence of the diameter or the position of said circular apertures is negligible and does influence the precision or stability of the detector.

The measurement receiver 13 and the reference receiver 14 are preferably photodiodes of similar construction, which as a result of the corresponding layout of the measurement and reference paths 15, 16 receive the same quantity of radiation or amounts of light from the light source 10. In this manner, the amounts of light emitted by the light source 10 towards the two receivers 13 and 14 are of equal intensity and thus the difference between the light intensities remains at zero until the optical properties of the measurement path 15 are altered by the foreign, airborne particles such as the above-mentioned penetrating smoke particles. Under such conditions, the difference between the light intensities then increases in proportion to the amount of smoke or other airborne particles in the measurement path 15.

Further, the light source 10 is arranged on a plate shaped support 19, which is screwed onto the end face of the optical bridge 6, thus sealing the chamber 9 in a dust-tight manner. The corresponding electrical connections are guided from the support 19 to the circuit board 5. The two receivers 13 and 14 are arranged on a common plate-shaped support 20, which is screwed to the other end face of the optical bridge 6 containing chambers 11 and 12. The corresponding electrical connections are guided from the support 20 to the circuit board 5. Fitted onto the underside of the base plate 1, as shown in FIG. 1, is a top-shaped, fine mesh-like grid or net structure 21 for protecting the optical bridge 6 from penetration by insects, larger smoke or dust particles, and other undesired foreign objects.

As a result of the sealing of the chamber 9 and the support plate 20 covering the chambers 11 and 12, it is ensured in the case of a smoke detector that practically no smoke particles enter the reference path 16, and thus there is no appreciable penetration of smoke particles into the reference path 16 via the circular aperture L of the measurement path 15 leading into the chamber 9. As can be observed in practice, there is at most a very slow dust build-up on the parts of the optical bridge 6 defining the measurement and reference paths 15, 16. In accordance with the present invention, it is by no means possible for smoke to enter the reference path 16 in appreciable quantities and to thereby affect the measurement result.

A further potential source of interference or inaccuracy is light penetrating the measurement path 15 from outside the detector. However, in, accordance with the present invention, undesired penetrating light is blocked by the circular aperture 18, the cylindrical wall 3 and by light stops 22 projecting radially inwards from the cylindrical wall 3 towards the optical bridge 6.

The evaluation and processing of the output signals of the measurement receiver 13 and of the reference receiver 14 is effected in the evaluating circuit, which is arranged on the circuit board 5 and will not be described in further detail here. In this respect, reference is made to European Patent No. EP-A-0 886 252, which contains a detailed description of a suitable evaluation circuit and which is herein incorporated by reference.

In principle, the optical bridge 6 has potentially two shortcomings in that the accuracy and stability of the detector is subject to the temperature sensitivity of the photodiodes 13 and 14 and the emission of an LED forming the light source 10. The temperature sensitivity of the photodiodes measures approximately 100 to 1000 ppm/°C., and that of the an LED emission measures approximately 4000 to 8000 ppm/°C. Even if a pair of photodiode chips arranged adjacent to each other on a silicon wafer is used in each case for the two photodiodes 13 and 14, a nearby optical bridge 6 balanced at room temperature could become unbalanced at temperatures deviating from room temperature.

When an LED is used as the light source, there is an added consideration in that the temperature coefficient of the LED is marginally or slightly dependent upon the emission direction. This also applies to bare LED integrated circuits (chips), i.e., those having no bonding wire crossing the chip, epoxy covering, pressed glass lid or the like. The reason for this dependence of the temperature coefficient of the emission is due to the temperature dependent index of refraction of the LED chip material, such as gallium arsenide, whose index of refraction increases by approximately 0.23% between 20° and 50° C. The light emerging from the LED chip is increasingly deflected from the normal as the temperature rises and thus the light lobe, which is never entirely perpendicular to the chip, easily disperses thus causing the optical bridge 6 to become unbalanced.

In order minimize these possible disturbing influences, the temperature drift of the optical bridge 6 is measured and a corresponding temperature drift curve is determined and stored in a non-volatile storage or memory device of the evaluating circuit. During the evaluation of the detector (measurement) signal, an adjusted measurement signal is computed to take into account the measured and stored temperature drift. In this respect, the measurement of the temperature drift is performed periodically in situ at the assembled or installed detector or within the framework of the manufacturing process or even during detector inspections. The recording or storing of the temperature drift curve is preferably effected using a memory device such as an electrically erasable programmable read-only memory (EEPROM).

The measurement of the temperature of the optical bridge 6 is effected by a negative temperature coefficient (NTC) resistor (not illustrated) arranged on the plate 19. In addition to the temperature measurement in the interior of the detector, a measurement of external temperatures can also be effected such that the described transmitted light detector can also be used for detecting aerosol-free fires.

In the case of measuring an external temperature, a further NTC resistor is provided in a region of the detector hood easily accessible to the surrounding air, the output signal of the NTC resistor being compared with a temperature threshold value. When this threshold value is exceeded, an alarm is triggered. In this case, the construction of the detector hood and the arrangement of the NTC resistor for measuring the temperature of the surrounding air as well as the evaluation of the resistor signal are similar to the optical-thermal smoke detector PolyRex® of the above-mentioned AlgoRex® fire alarm systems available from Siemens Building Technologies AG.

In order to measure the temperature drift curve within the framework of the manufacturing process or during detector inspections, an aluminum part carrying the optical bridge 6 is provided with a small heater. This heater is activated at the end of the manufacturing process or during detector inspections and measurements are undertaken at different temperatures, wherein the measurements represent the temperature drift curve. The measurements are then recorded and stored in the EEPROM of the detector.

The heater can be, for example, a power transistor, a positive temperature coefficient (PTC) heating element, a thick film resistor or a thin film resistor on ceramic. An assumption for using this method is that the temperature drift curve does not vary during the service life of the detector or during the period between two detector inspections. Tests have shown that a typical temperature drift curve remains constant over long periods of time and that, at most, the absolute position shifts slightly. This slight shift can be compensated by readjusting the detector signal.

The temperature drift curve can also be measured within the framework of the manufacturing process by placing the detector, which in this case required no special heater, into an oven at the end of the manufacturing process and running a suitable temperature cycle of, for example 20° to 60° C., and thereby recording or storing the temperature drift curve in the EEPROM of the detector.

Figure 4:
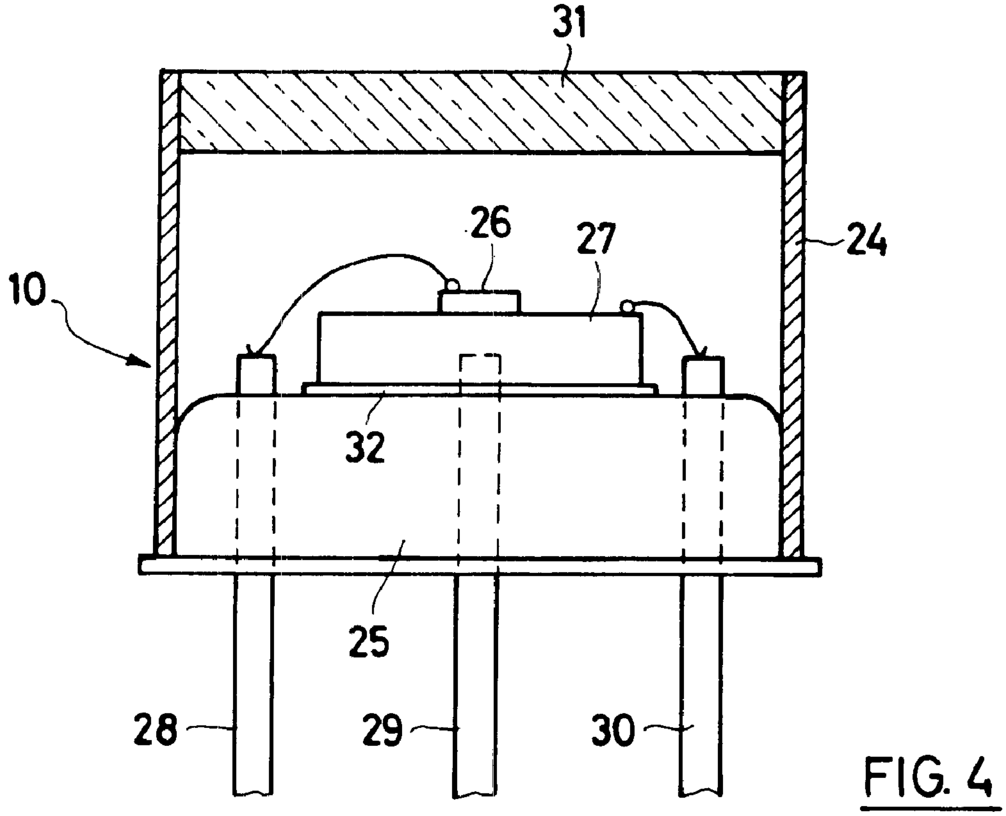
FIG. 4 is a sectional view of a light source for use in the detector assembly of FIGS. 1–3.

In order to measure the temperature drift curve in situ at the assembled or installed detector, a heatable light source 10 is used. An example of a light source of this type is illustrated in FIG. 4 in a schematic view with the housing cut away. As shown in FIG. 4, the light source 10 includes a base or floor 25 for supporting an LED chip 26 enclosed by a housing wall 24. Provided between the chip 26 and the base 25 is a self-regulating PTC heating element 27. The light source 10 further includes three connecting wires 28, 29 and 30, wherein the connection 28 is bonded to the chip 26, the upper surface of the PTC heating element 27 is bonded to the connection 30, and the lower surface of the heating element 27 is bonded to the connection 293 As known in the art, the term "bonding" is understood to mean the formation of electrical connections between semi-conductor elements using thin gold wires.

The PTC heating element 27 is made, for example, of doped barium titanate, wherein the contact surfaces are coated in each case with gold, silver or aluminum. At the top, the housing is sealed by a glass cover 31. If necessary, a thermal insulation layer 32, for example a glass sheet, can be provided between the PTC heating element 27 and the base 25. The heating element 27 is periodically heated to different temperatures, for example once a day, and the temperature drift curve is measured and stored in the EEPROM of the detector. Since it cannot be ruled out that a fire has just occurred during the measurement of the temperature drift curve, the temperature drift curve of the previous day in the case of a smoke detector is always used for the temperature drift compensation of the detector (measurement) signal.

Figure 3:
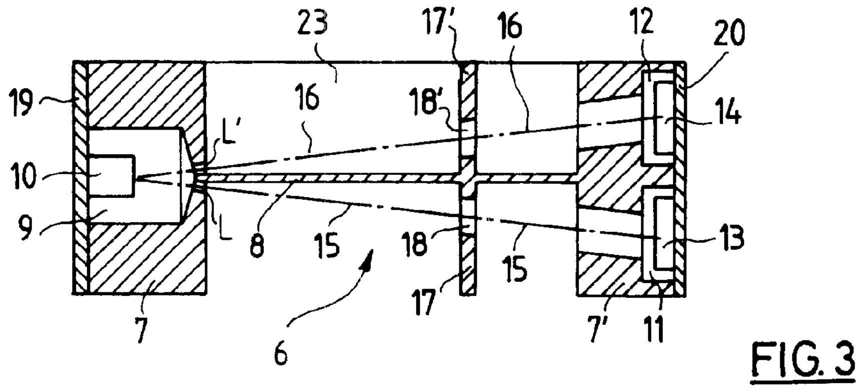
FIG. 3 is a sectional view of an optical bridge of the detector assembly of FIG. 2 taken along the line III—III in FIG. 2.

Instead of the PTC heating element 27, a different micro-heater can also be used within the housing of the LED 26, for example a transistor chip or a platinum wire heater. Tests have shown that a platinum wire heater exhibits the same temperature drift curve as a heating of the entire light source 10 from the outside. This method is advantageous in that it allows for an adaptation of the detector to the varying component properties during the service life of the detector. However, it is a prerequisite that the two photodiodes 13, 14 of FIG. 3 form a matching pair. If this is not the case, then contribution of the photodiodes to the temperature drift of the detector signal must be determined according to one of the methods described above during the manufacture of the detector.

In all three methods described, the natural temperature fluctuation between day and night can be used in order to test the increase in the temperature drift curve in the corresponding section and to optionally readjust the temperature drift curve and if necessary to transmit a disturbance signal in the event of excessive deviations.

Although the present invention has been described in connection with particular embodiments thereof, it is to be understood that various modifications, alterations and adaptations may be made by those skilled in the art without departing from the spirit and scope of the invention. It is intended that the invention be limited only by the appended claims.

What is claimed is:

1. A device for detecting the presence of airborne particles, comprising:

a light source, an optical bridge disposed in front of said light source, said optical bridge having a first aperture through which said light source emits a first amount of light and a second aperture through which said light source emits a second, reference amount of light;

a first optical receiver for receiving a measured amount of light equal to all or an attenuated amount of the first amount of light emitted through said first aperture and for generating a measurement signal proportional to the measured amount of light, said measurement receiver being arranged with respect to said light source and said optical bridge so as to form a measurement path through which the first amount of light is subjected to attenuation or extinction due to said airborne particles disposed along the measurement path, and wherein said measurement path is less than 10 cm;

a second optical receiver for receiving the reference amount of light and for generating a reference signal proportional to the reference amount of light, said reference receiver being arranged with respect to said light source and said optical bridge so as to form a reference path through which the reference amount of light is substantially isolated from said airborne particles, and further wherein said light source, said optical bridge, and said first and second optical receivers are the only optical elements of said device; and a circuit coupled to the first and second optical receivers for processing and evaluating the measurement and reference signals.

2. An optical smoke detector comprising:

a light source;

an optical bridge disposed in front of said light source, said optical bridge having a first aperture through which said light source emits a first amount of light and a second aperture through which said light source emits a second, reference amount of light;

a measurement receiver for receiving a measured amount of light equal to all or an attenuated amount of the first amount of light emitted through said first aperture and for generating a measurement signal proportional to the measured amount of light, said measurement receiver being arranged with respect to said light source and said optical bridge so as to form a measurement path through which the first amount of light is subjected to attenuation or extinction due to airborne smoke particles disposed along the measurement path, and wherein said measurement path is less than 10 cm;

a reference receiver for receiving the reference amount of light and for generating a reference signal proportional to the reference amount of light, said reference receiver being arranged with respect to said light source and said optical bridge so as to form a reference path through which the reference amount of light is substantially isolated from the airborne smoke particles, and further wherein said light source, said optical bridge, and said measurement and reference receivers are the only optical elements of said detector; and a circuit coupled to the measurement and reference receivers for processing and evaluating the measurement and reference signals.

3. The detector according to claim 2, further comprising a chamber having an air reservoir wherein said light source is housed.

4. The detector according to claim 3, wherein said chamber has a surface area substantially larger than the surface area of said light source.

5. The detector according to claim 2, wherein said optical bridge further comprises at least one partition traversing said measurement path, said at least one partition having a partition aperture aligned with said first aperture for blocking laterally penetrating, interfering light without affecting the first amount of light emitted by said light source through said first aperture.

6. The detector according to claim 2, wherein said optical bridge further comprises at least one partition traversing said reference path, said at least one partition having a partition aperture aligned with said second aperture for blocking laterally penetrating, interfering light without affecting the reference amount of light emitted by said light source through said second aperture.

7. The detector according to claim 2, wherein said optical bridge further comprises:

a first end section having a chamber for housing said light source;

a second end section having corresponding chambers for housing said measurement and reference receivers; and a center partition connecting said end sections arranged such that said measurement path is disposed on one side of said center partition and said reference path is disposed on the other side of said center partition.

8. The detector according to claim 7, further comprising:

a base plate having a recess disposed therethrough;

a circuit board having a first side for supporting said circuit and a second side secured to said base plate for supporting said optical bridge, said optical bridge being arranged so to as extend through said recess with said reference path facing said second side of said circuit board; and two side walls one each disposed on either side of said reference path for laterally sealing said reference path and for connecting said first and second end sections and said center partition.

9. The detector according to claim 7, further comprising:

a base plate for supporting on one side said optical bridge such that said reference path faces said base plate;

a circuit board secured to the other side of said base plate for supporting said circuit; and two side walls one each disposed on either side of said reference path for laterally sealing said reference path and for connecting said first and second end sections and said center partition.

10. The detector according to claim 7, wherein said chambers in said first and second end sections are sealed.

11. The detector according to claim 7, wherein:

said chamber in said first end section is sealed by a first plate; and said chambers in said second section are sealed by a second plate.

12. The detector according to claim 2, further comprising an internally mounted temperature sensor for measuring the temperature of said optical bridge.

13. The detector according to claim 2, further comprising an externally mounted temperature sensor for measuring a temperature outside said detector.

14. The detector according to claim 2, further, comprising a detector hood cover.

15. The detector according to claim 2, further comprising a mesh-like structure arranged over said optical bridge for protecting said optical bridge from undesired foreign objects penetrating into said detector.

16. The detector according to claim 2, wherein said optical bridge is comprised of a material having good thermal conductivity.

17. The detector according to claim 16, wherein said optical bridge is comprised of aluminum.

18. The detector according to claim 16, wherein said optical bridge is comprised of cast zinc.

19. The detector according to claim 2, wherein said circuit comprises:

a non-volatile storage element for storing temperature drift information corresponding to said optical bridge; and computation means for adjusting said measurement signal in accordance with the temperature drift information.

20. The detector according to claim 2, wherein said light source comprises:

a light source housing;

a light-emitting diode disposed within said housing; and a micro-heater disposed within said light source housing and in contact with said light-emitting diode.

21. The detector according to claim 20, wherein said micro-heater is selected from a group consisting of a platinum wire heater, a positive temperature coefficient heating element, an integrated transistor circuit, a thick film resistor and a thin film resistor on ceramic.

22. The detector according to claim 20, wherein said light source further comprises a thermal insulation layer disposed between said micro heater and said light source housing.

23. A method of compensating for temperature drift in a device for detecting the presence of airborne particles, the device having at least a light source, an optical bridge and an optical measurement receiver, whereby said light source, said optical bridge, and said optical measurement receiver are the only optical elements of said device, said method comprising:

heating the light source at different temperatures;

storing the output of the measurement receiver at the different temperatures to characterize the temperature drift of the optical bridge; and adjusting the measurement receiver output to compensate for the temperature drift of the optical bridge.

24. A method of compensating for temperature drift in a smoke detector having at least a light source, an optical bridge and a measurement receiver, whereby said light source, said optical bridge, and said optical measurement receiver are the only optical elements of said smoke detector, said method comprising:

heating the light source at different temperatures;

storing the output of the measurement receiver at the different temperatures to characterize the temperature drift of the optical bridge; and adjusting the measurement receiver output to compensate for the temperature drift of the optical bridge.

25. The method according to claim 24, wherein said light source includes a light-emitting diode that is heatable by a micro-heater, said method further comprising:

periodically activating the micro-heater in situ in the detector; and periodically storing the measurement receiver output to characterize the temperature drift of the optical bridge.

26. The method according to claim 25, further comprising the step of performing said activating and storing steps during a manufacturing process of the detector.

27. The method according to claim 25, further comprising the step of performing said activating and storing steps during an inspection of said detector.

28. The method according to claim 24, further comprising:

placing the detector into an oven at the end of the manufacturing process;

cycling the oven temperature through a predetermined temperature range; and storing the measurement receiver output while the oven is cycled through the temperature range in order to characterize the temperature drift of the optical bridge.

29. The method according to claim 24, further comprising:

monitoring a temperature outside the detector; and activating an alarm if the temperature outside the detector exceeds a corresponding temperature threshold value.

* * * * *